H. R. SAXON.
CARRIER FOR SPARE RIMS OR WHEELS.
APPLICATION FILED JUNE 22, 1917.
1,412,752.
Patented Apr. 11, 1922.
2 SHEETS—SHEET 1.
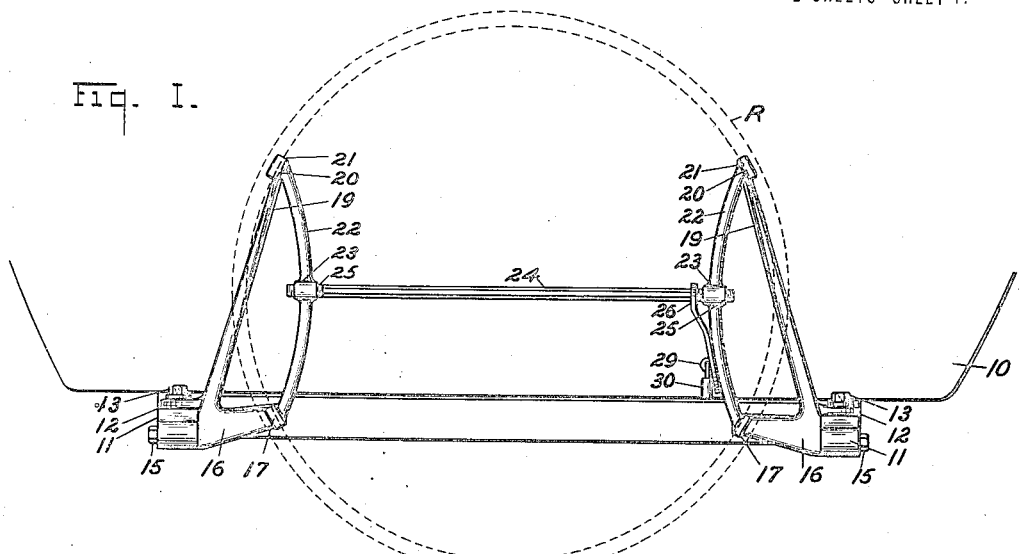
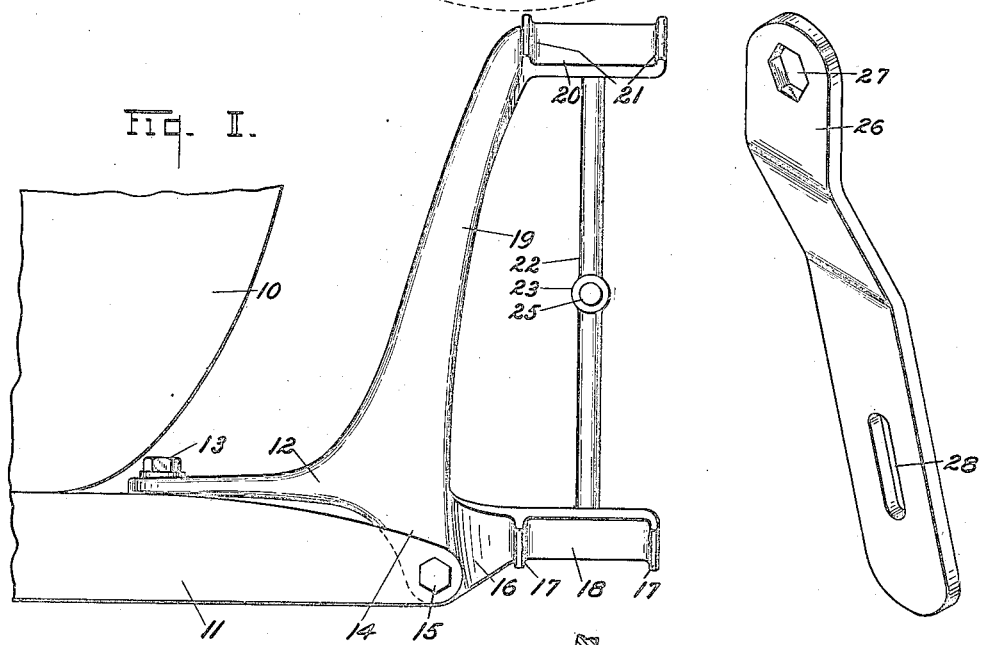
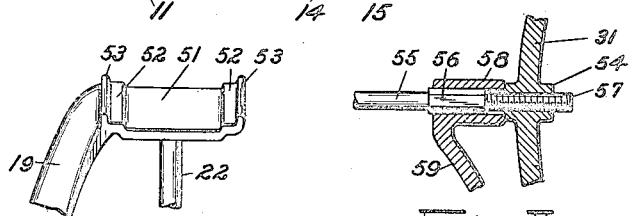
Inventor
Herman R. Saxon
By Chester H. Braselton
Attorney

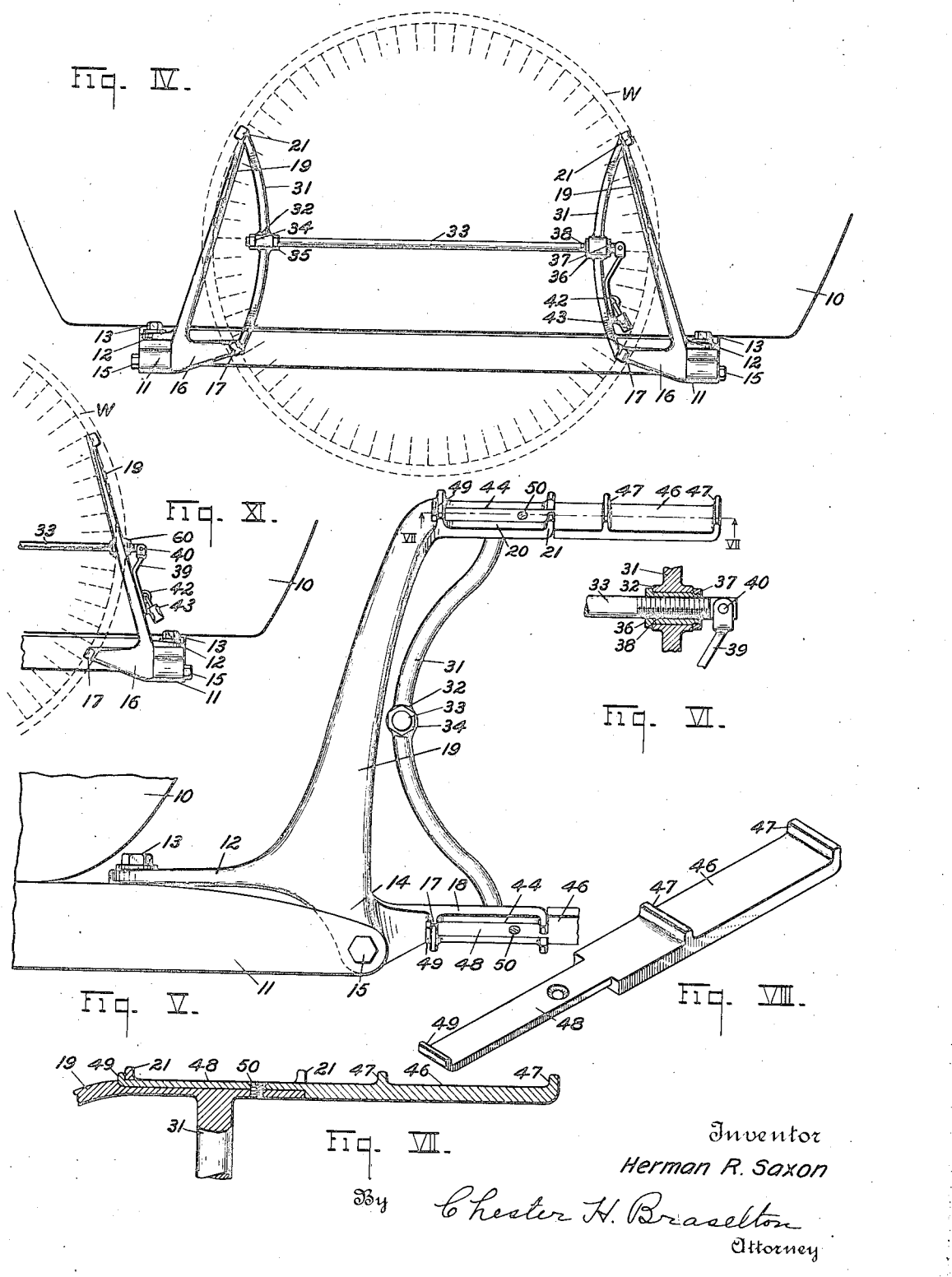

UNITED STATES PATENT OFFICE.

HERMAN R. SAXON, OF TOLEDO, OHIO, ASSIGNOR, BY MESNE ASSIGNMENTS, TO INDUSTRIAL RESEARCH CORPORATION, OF TOLEDO, OHIO, A CORPORATION OF DELAWARE.

CARRIER FOR SPARE RIMS OR WHEELS.

1,412,752.

Specification of Letters Patent. Patented Apr. 11, 1922.

Application filed June 22, 1917. Serial No. 176,324.

*To all whom it may concern:*

Be it known that I, HERMAN R. SAXON, a citizen of the United States, residing at Toledo, in the county of Lucas and State of Ohio, have invented certain new and useful Improvements in Carriers for Spare Rims or Wheels, of which I declare the following to be a full, clear, and exact description.

This invention relates to improvements in carriers for spare rims and wheels.

The principal object of this invention is to provide a simple and convenient carrier, which can be used for either spare rims or spare wheels and which can be operated very conveniently and can be easily locked to prevent the removal of the rims or wheels from the carrier.

A further object is to provide a carrier so constructed that supplemental rim supports may be attached thereto to take care of an extra rim or wheel. A further object of my invention is to provide a very simple, light and compact carrier for spare rims or wheels, and one which can be produced very cheaply and economically.

Further objects, and objects relating to economies of manufacture and details of construction, will definitely appear from the detailed description to follow.

I accomplish the objects of my invention by the devices and means described in the following specifications. My invention is clearly defined and pointed out in the appended claims.

A structure, constituting a preferred embodiment of my invention is illustrated in the accompanying drawing, forming a part of this specification, in which Fig. I is a view in rear elevation of a carrier constructed in accordance with my invention, attached to the rear of an automobile.

Fig. II is a fragmentary view in side elevation of the carrier shown in Fig. I.

Fig. III is a perspective view of the operating member detached from the carrier.

Fig. IV is a view in rear elevation of a slightly modified form of carrier, which is especially adapted for use with wire wheels.

Fig. V is a view in side elevation of the carrier shown in Fig. IV.

Fig. VI is a detail, sectional view showing the connection of the tensioning bar and brace.

Fig. VII is a detail, sectional view taken substantially on the line VII—VII of Fig. 5.

Fig. VIII is a detail, perspective view of the detachable rim support for supporting a second rim or wheel.

Fig. IX is a detail, perspective view of a slightly modified form of rim support.

Fig. X is a detail, sectional view, corresponding to Fig. VI, and showing a slightly modified construction of tensioning rod and means for connecting said rod with the brace connecting the rim supports.

Fig. XI is a fragmentary view, in rear elevation, showing another modification of my invention.

In the drawings similar reference numerals refer to similar parts throughout the several views, and the sectional views are taken looking in the direction of the little arrows at the ends of the section lines.

Considering the numbered parts of the drawing, the automobile body is represented at 10 and the rear end of one of the longitudinally extending frame members at 11. My improved carrier comprises a pair of brackets, each having a base portion 12, connected to one of the frame members 11, by the bolt 13, and having a downwardly extending arm 14, connected to the rear end of the frame member 11 by the bolt 15. Each of said brackets has an arm 16 extending laterally and rearwardly, and carrying at its free end a rim support 18, provided with flanges 17 for preventing lateral movement of the rim upon the support. Each bracket also has an arm 19, extending upwardly, laterally and rearwardly, and carrying at its upper free end a rim support, provided with flanges 21, for preventing lateral movement of the rim upon the support. The rim supports 18 and 20 of each bracket are in line when the brackets are secured in place on the frame of the vehicle and are connected by a brace 22, as shown in Figs. I and II of the drawing. Each of said braces 22 is provided with a boss 23, near the center thereof, said bosses each having an internally threaded opening therethrough. A tensioning bar 24 of polygonal cross section is provided, the end of said tensioning bar being oppositely threaded at 25 and screwed into the internally threaded openings of said bosses 23. An operating member is provided having a head 26 with an opening 27 of polygonal cross section therein, said operating member being disposed on said tensioning bar with the bar passing through said opening, so that the tensioning bar may be rotated by means of the operating member. Said member has its free end bent laterally and provided with a slot 28, through which an eye 29, which is preferably formed integral with one of the braces 22, will pass to hold the operating member against movement. A padlock 30 may be passed through said eye 29, as shown in Fig. I of the drawing, to prevent the unauthorized rotation of the bar 24 by means of the operating member. The operating member is bent laterally so much that it is necessary to spring it lightly in order to cause the eye 29 to pass through the slot 28, so that, when the padlock 30 is applied, the operating member is held under slight tension, so as to prevent its rattling when locked in place.

In Figs. IV and V, I have shown a modified form of my invention which is especially designed to receive either spare rims or wheels. In this modification of my invention, the central parts of brace 31, which connects the rim supports 20 and 18, is curved forwardly, so that the central part thereof is out of the plane of the rim supports, as appears from Fig. V of the drawing. Each of the braces 31 is provided, at a point near the center thereof, with a boss 32 to support the tensioning bar 33 disposed between the two braces. At one end, the tensioning bar is rotatably mounted in the boss 32 of the brace 31, being held against longitudinal movement relative thereto, by means of the nuts 34 and 35, threaded on said tensioning bar. At the other end of said tensioning bar, a sleeve 36 is inserted in the boss 32, and held in place therein by means of a nut 37, and said sleeve is internally threaded to receive the threaded end 38 of the bar 33. An operating member 39 is pivotally connected by the pin 40 to the outer end of said tensioning bar, outside of said brace 31, and said operating member is locked to the corresponding brace by means of the eye 42 and the padlock 43, as in the preferred form of my invention.

In Figs. V, VII and VIII, I have shown a further modification of my invention in which the carrier is slightly modified so as to permit the use of an attachment to enable the carrier to support a pair of rims or a pair of wheels. In this modification, each of the rim supports 18 and 20 is provided with a groove 44, extending longitudinally thereof and through the outer flanges 21 and 17, while the slot 44 extends beyond and beneath the inner flanges 17 and 21, as clearly appears from Fig. V of the drawing. Detachable rim supports 46 are provided having the flanges 47 to prevent lateral shifting of the rim and having a tongue 48, of substantially the width of the groove 44, provided at its free end with an upturned flange 49. These detachable rim supports have their tongues 48 disposed in the grooves 44 with the flange 49 extending into interlocking engagement with the inner flange 21, as shown in Fig. VII of the drawing. Said detachable rim support is further secured to the permanent rim support by means of a screw 50. It will be seen that it is a very simple thing, by the use of this detachable rim support, to add to the capacity of the carrier so as to permit of the supporting of a pair of rims or wheels.

In Fig. IX, I have shown a slightly modified form of rim support, which has the base portion 51, the rim supporting shoulders 52 and the flanges 53 to prevent lateral shifting of the rim on the support. By the use of a rim support, such as is shown in Fig. IX, it is not necessary to position the rim with reference to the carrier due to the presence of lugs on the inner surface of the rims, as the rim is supported a slight distance away from the base portion of the support and at its edges, so that any driving lugs or the like can be accommodated between the base portion 51 and the shoulders 52.

In Fig. X, I have shown a slightly modified form of tensioning bar and its connection with the brace rod 31 connecting the rim supports. In this form of my invention, the main portion of the tensioning bar 55 is made of round stock, having a polygonal portion 56 and a threaded end 57 which is screwed into the boss 54 of the brace rod 31. The operating member 59 is provided with a head 58 having an opening therethrough, which is polygonal in cross section, and which is of about the length of the polygonal portion 56, so that, when the operating handle is locked in position against the side of the brace rod 31, the head 58 of the operating member will cover the polygonal part of the tensioning bar, and that part of the threaded portion 57, between said polygonal portion and the brace rod.

In Fig. XI, I have shown still another modification of my invention, in which the brace rods 22 or 31 are omitted and the tensioning bar connects the upwardly extending arms 19 and serves to spread them directly to lock the rim or wheel in place on the carrier. In this form of my invention, the bar 19 is provided midway of its length with the boss 60, in which the end of the tensioning bar 33 is threaded, in substantially the way shown in Fig. IV of the drawing, the operating handle 39 being pivotally connected at 40 to the end of said tensioning bar and secured by the padlock 43, passing through the eye 42 integral with the arm 19.

From the description of the parts given above, the operation of my device should be very readily understood. It will be seen that each bracket comprises a pair of rim supports, 18 and 20, one of which is carried by the arm 16, which is comparatively short, while the other is carried by an arm 19, which is comparatively long and is made of such material as to have some spring and resilience. In Fig. I, a rim is shown locked in place on the carrier, said rim being indicated at R by means of dotted lines. When it is desired to remove the rim, padlock 30 is unlocked, and the operating member is moved so as to remove the eye 29 from the slot 28 so that the operating member can be rotated to turn the bar 24 in the proper direction. Rotation of this tensioning bar 24 in the proper direction will tend, due to the fact that the ends of said bar are oppositely threaded, to draw the upper ends of said arms 19 carrying the rim support 20 together, there being sufficient resilience in said arms to permit this movement, so that said arms may be drawn towards each other sufficiently to permit the rim to clear the outer flanges 21 of the rim supports 20. The upper part of the rim can then be swung rearwardly from the upper rim supports and dropped from the lower rim supports, as will be clearly apparent from the drawings. When it is desired to lock a rim in place upon the carrier, the rim is first positioned with the inner surface thereof in engagement with the lower rim supports 18, the flanges 17 thereof preventing lateral shifting of the rim. The rim is then moved into alignment with the upper rim support 20, and the tensioning bar 24 is rotated so as to spread the arms 19 and bring the upper rim supports 20 into clamping engagement with the rim. The operating handle can then be moved to the side of the carrier, as shown in Fig. I, and locked in position and, when locked in position will be held under the tension due to the fact that the operating member has to be sprung slightly to bring the eye 29 through the slot 28.

The modification of my invention shown in Figs. IV and V operates in substantially the same way as that shown in Figs. I and II, but, in this form, the brace rods 31, connecting the upper and lower rim supports, are curved forwardly so as to bring the tensioning bar 33 out of the plane occupied by the wheel, or out of the plane of the rim supports. In this form I have shown another manner of rotating the tensioning bar, in which the operating handle is permanently attached to one end of the tensioning bar.

The modification of my invention, shown in Fig. XI, is substantially the same as that shown in Figs. I, II and IV, with the exception that the brace rods between the upper and lower rim supports are omitted, and the tensioning bar 33 operates directly to spread the arms 19.

The detachable rim support, shown in Figs. V, VII and VIII, may be used in any of the forms of my invention, and it is apparent that this makes a very simple means for adding to the capacity of the carrier. If it is not desired to use the supplemental rim support, it can be very easily removed by removing the screw 50, lifting the outer end of the supplemental rim support, so as to allow the flange 49 to pass in under the inner flange 21, and then drawing the tongue 48 out of the groove 44. The permanent rim support may be then used alone and it is not impaired in any way by the provision of the slots 44 and 45, to accommodate the supplemental rim support.

I am aware that the particular embodiment of my invention, which I have here shown and described, is susceptible of considerable variation without departing from the spirit of my invention. But I have found that this particular embodiment is desirable from many standpoints and, therefore, I desire to claim the same specifically as well as broadly, as indicated by the appended claims.

Having thus described my invention, what I claim as new and desire to secure by Letters Patent is—

1. A device of the class described comprising the combination of a pair of brackets, each having a base adapted to be secured to the vehicle frame, an arm extending laterally and rearwardly from said base, and carrying a lower rim support, an arm extending upwardly, rearwardly and laterally from said base, and carrying an upper rim support in line with the lower rim support, and a brace connecting the upper and lower rim supports; a tensioning bar connecting said braces and adapted, on rotation, to vary the distance between them; an operating member permanently carried by said tensioning bar; and means for locking said operating member to one of said braces.

2. A device of the class described comprising the combination of a pair of brackets, each having a base adapted to be secured to the vehicle frame, an arm extending laterally and rearwardly from said base, and carrying a lower rim support, an arm extending upwardly, rearwardly and laterally from said base, and carrying an upper rim support in line with the lower rim support, and a brace connecting the upper and lower rim supports; a tensioning bar connecting said braces and adapted, on rotation, to vary the distance between them; and an operating member permanently carried by said tensioning bar.

3. A device of the class described comprising the combination of a pair of brackets, each having a base adapted to be secured to the vehicle frame, an arm extending laterally and rearwardly from said base, and carrying a lower rim support, an arm extending upwardly, rearwardly and laterally from said base, and carrying an upper rim support in line with the lower rim support, and a brace connecting the upper and lower rim supports; a tensioning bar connecting said braces and adapted, on rotation, to vary the distance between them; and means for rotating said tensioning bar.

4. A device of the class described, comprising the combination of a pair of brackets, each having a base adapted to be secured to the vehicle frame, an arm extending from said base, and carrying a rim support, a flexible arm extending from said base and carrying a rim support; a tensioning mechanism connecting said flexible arms and adapted to vary the distance between the same; an operating member carried by said tensioning mechanism; and means for locking said operating member against rotation.

5. A device of the class described comprising the combination of a pair of brackets, each having a base, adapted to be secured to the vehicle frame, an arm extending from said base, and carrying a rim support, a flexible arm extending from said base, and carrying a rim support; a device for varying the distance between said flexible arms; and means for locking said device against unauthorized actuation.

6. A device of the class described, comprising the combination of a pair of brackets, each having a base adapted to be secured to the vehicle frame, an arm extending laterally from said base, and carrying a lower rim support, a flexible arm extending upwardly from said base, and carrying an upper rim support in line with the lower rim support; means for moving said flexible arms relative to each other; and locking means adapted to prevent unauthorized operation of said last mentioned means.

7. A device of the class described comprising the combination of a pair of brackets adapted to be secured to the vehicle frame; a lower rim support carried by each of said brackets; an upper rim support carried by each of said brackets in line with the lower rim support; a brace connecting the upper and lower rim supports; a tensioning bar connecting said braces and adapted, on rotation, to move said upper rim supports relative to each other; operating means for rotating said tensioning bar; and means for preventing the unauthorized actuation of said operating means.

8. A device of the class described comprising the combination of a pair of brackets, adapted to be secured to the vehicle frame; a lower rim support carried by each of said brackets; an upper rim support carried by each of said brackets in line with the lower rim support; a brace connecting said upper and lower rim supports; and means adapted to move said braces relative to each, to vary the distance between the upper rim supports.

9. A device of the class described comprising the combination of a pair of brackets, adapted to be secured to the vehicle frame; a fixed rim support carried by each of said brackets; a flexible rim support carried by each of said brackets; and means for moving said flexible rim supports relative to each other.

10. A device of the class described comprising the combination of a pair of brackets adapted to be secured to the vehicle frame; a lower rim support carried by each of said brackets; a flexible arm upon each of the brackets having an upper rim support; means for moving said flexible arms relative to each other; and means for preventing the unauthorized movement of said arms.

11. A device of the class described comprising the combination of a pair of brackets, adapted to be secured to the vehicle frame; a lower rim support carried by each of said brackets; a flexible arm extending from each of said brackets and having an upper rim support thereon; and means for moving said flexible arms relative to each other.

12. A device of the class described comprising the combination of a pair of brackets, each having a flexible arm provided with a rim support; rim supports carried by each bracket; and means for moving said flexible arms relative to each other.

13. A device of the class described comprising the combination of a pair of brackets; a lower rim support carried by each of said brackets, an upper rim support carried by each of said brackets, in line with the lower rim support; braces connecting each pair of rim supports, each of said braces having a central portion curved forwardly out of the plane of said rim support; and means connecting the central portions of said braces and adapted to move said upper rim supports relative to each other.

14. A device of the class described comprising the combination of a pair of brackets adapted to be secured to the vehicle frame, each having an up-standing flexible arm; a lower rim support carried by each of said brackets; an upper rim support carried by each of said arms; and means adapted to move the free ends of said arms relative to each other, said means being located out of the plane of said upper and lower rim supports.

15. A device of the class described comprising the combination of a pair of brackets, each having a base adapted to be secured to the vehicle frame; a lower rim support carried by said base; a flexible arm extending upwardly from said base and carrying an upper rim support, and a tensioning mechanism connecting said arms and disposed out of the plane of said rim support, said mechanism being adapted to be actuated to move said upper rim supports relative to each other.

16. A device of the class described comprising a pair of brackets adapted to be secured to the vehicle frame; a permanent lower rim support carried by each bracket; a permanent upper rim support carried by each bracket the said upper and lower permanent rim supports being provided with slots; means for moving said upper rim supports relative to each other; inner and outer flanges upon said rim support; a supplemental rim support detachably secured to each of said permanent rim supports, and having a laterally extending tongue disposed in the slot formed in the permanent rim support, and an upturned flange at the free end of said tongue engaging the inner flange of the permanent rim support.

17. In a device of the class described, the combination of a permanent rim support, having a rim supporting base and a pair of flanges to prevent lateral shifting of the rim; a groove formed in said base and through one of said flanges, said groove extending under the other of said flanges; and a supplemental rim support comprising a rim supporting base, a pair of flanges to prevent lateral shifting of the rim, and a tongue, disposed in the groove formed in said permanent rim support, and having an upturned flange engaging the inner flange of said permanent rim support; and means for detachably securing said supplemental rim support to said permanent rim support.

18. In a device of the class described, the combination of a permanent rim support, having a rim supporting base, and a pair of lateral flanges for preventing lateral shifting of a rim, said rim supporting base being provided with a groove formed therein; a supplemental rim support having a rim supporting base and a pair of flanges to prevent lateral shifting of the rim, and a tongue extending laterally from said rim support and adapted to be disposed in the groove formed in said permanent rim support; and means on the end of the tongue adapted to engage one of the flanges to prevent separation of the supports.

19. In a device of the class described, the combination of a permanent rim support having a base portion, a flexible arm extending upwardly from the base portion having formed thereon rim supporting shoulders disposed in a plane above said base portion at the sides thereof, and flanges at the edges of said rim supporting shoulders arranged to contact with the rim, adapted to prevent lateral shifting of the same the whole forming an integral unitary structure.

20. In a device of the class described, the combination of a pair of brackets adapted to be secured to the vehicle frame; a lower rim support carried by each of said brackets; an upper rim support carried by each of said brackets; a tensioning bar connecting said brackets and adapted to move said brackets relative to each other, said tensioning bar having a cylindrical portion and a polygonal portion; an oscillating lever for operating the bar having a head operatively engaging said polygonal portion, and means for locking said operating lever against oscillation.

21. In a device of the class described, the combination of a pair of brackets adapted to be secured to the vehicle frame; a lower rim support carried by each of said brackets, an upper rim support carried by each of said brackets; a tensioning mechanism connecting said brackets and adapted to move said brackets relative to each other, said tensioning mechanism including a bar having a polygonal portion and a cylindrical portion; and an operating member mounted on said bar and having a head, provided with an opening of polygonal cross section corresponding to the cross section of the polygonal portion of said bar, said operating member being movable to cause the head thereof to clear said polygonal portion whereby said operating member may be rotated relative to the bar.

22. In a device of the class described, the combination of a pair of brackets adapted to be secured to the vehicle frame, a lower permanent rim support carried by each of said brackets, an upper permanent rim support carried by each of said brackets, a tensioning mechanism connecting said brackets and adapted to move said brackets relative to each other, supplemental rim supports, separable fasteners connecting the permanent rim supports to the supplemental rim supports, and means for operating the tensioning mechanism.

In testimony whereof I affix my signature.

HERMAN R. SAXON,